US008311783B2

(12) United States Patent
Fijany et al.

(10) Patent No.: US 8,311,783 B2
(45) Date of Patent: Nov. 13, 2012

(54) METHOD FOR THE GENERATION OF A SET OF CONFLICTS FOR MODEL-BASED SYSTEM DIAGNOSTICS, AND CORRESPONDING DIAGNOSTIC METHOD

(75) Inventors: Amir Fijany, Serra Ricco' (IT);
Anthony Barrett, Pasadena, CA (US);
Farrokh Vatan, West Hills, CA (US)

(73) Assignee: Fondazione Istituto Italiano di Technologia, Genova (IT)

( * ) Notice: Subject to any disclaimer, the term of this patent is extended or adjusted under 35 U.S.C. 154(b) by 271 days.

(21) Appl. No.: 12/841,691

(22) Filed: Jul. 22, 2010

(65) Prior Publication Data
US 2011/0022891 A1 Jan. 27, 2011

(30) Foreign Application Priority Data
Jul. 23, 2009 (IT) .............................. TO2009A0562

(51) Int. Cl.
*G06F 17/50* (2006.01)
*G06F 9/45* (2006.01)
*G06F 11/07* (2006.01)

(52) U.S. Cl. .................. 703/2; 703/13; 703/22; 714/26; 714/E11.029; 714/E11.138

(58) Field of Classification Search ................ 703/2, 13; 714/26, E11.029, E11, 138; 716/52, 111
See application file for complete search history.

(56) References Cited

U.S. PATENT DOCUMENTS 7,752,511 B2 * 7/2010 Fulton et al. .................. 714/725
2008/0120129 A1 * 5/2008 Seubert et al. .................... 705/1
2008/0177994 A1 * 7/2008 Mayer .............................. 713/2
2011/0016444 A1 * 1/2011 Paris et al. ..................... 716/111
2011/0185323 A1 * 7/2011 Hogan et al. .................... 716/52

OTHER PUBLICATIONS

"A New Efficient Method for System Structural Analysis and Generating Analytical Redundancy Relations", A. Fijany and F. Vatan; Aerospace Conference, Mar. 7, 2009 IEEE; pp. 1-12.
"Conflicts Versus Analytical Redundancy Relations: A Comparative Analysis of the Model Based Diagnosis Approach From the Artificial Intelligence and Automatic Control Perspectives", M-O Cordier, P. Dague, F. Levy, J. Montmain, M. Staroswiecki and L. Trave-Massuyes; Oct. 1, 2004 IEEE; pp. 2163-2177.

* cited by examiner

*Primary Examiner* — Thai Phan
(74) *Attorney, Agent, or Firm* — Harness, Dickey & Pierce, P.L.C.

(57) ABSTRACT

A method for the generation of a set of conflicts for model-based system diagnostics is described, with which system a plurality of sensors is associated for the observation of variables indicative of operation conditions.
The method starts from generating a complete set of Analytical Redundancy Relations (ARRs) in implicit form and, for each diagnosis instance: it performs a system simulation, computing the expected values for a first subset of Analytical Redundancy Relations (D-ARRs) including the relations involving only one system observation variable; it compares the expected and observed values of the system observation variables to identify the inconsistent variables, i.e. the unsatisfied redundancy relations, indicating a fault in at least one system component; and, when discrepancies are detected, it checks the consistency of each relation belonging to a second subset of Analytical Redundancy Relations (I-ARR), comprising relations involving a plurality of system observation variables, at least one of which exhibits discrepancies between expected and observed values; therefore identifying the support set of the unsatisfied Redundancy Relations as set of system conflicts.

8 Claims, 1 Drawing Sheet

METHOD FOR THE GENERATION OF A SET OF CONFLICTS FOR MODEL-BASED SYSTEM DIAGNOSTICS, AND CORRESPONDING DIAGNOSTIC METHOD

FIELD OF THE INVENTION

The present invention is related in general to system diagnostics and, more specifically, to the generation of a conflicts set for the model-based diagnostics of a system, and to a method for the diagnosis of a system, based on the determination of a set of conflicts, representing the actual behaviour of the system.

Particularly, the object of the invention is a method for the generation of a set of conflicts of the type described in the preamble of Claim 1, and a method for the diagnosis of a system, according to the preamble of Claim 6.

BACKGROUND OF THE INVENTION

The operation of a system—general term used in this description and in the attached claims to represent industrial plants, manufacturing or research equipment, various types of vehicles (e.g. aircraft or spacecraft)—is controlled usually by means of complex diagnostic systems able to detect and isolate abnormal operating conditions as soon as they occur. In ground-controlled space missions, either in Earth orbit or in deep space, prominent attention is devoted to the diagnosis of the system formed by the spacecraft and its onboard equipment, and in particular to the real-time detection of system faults, to correct the malfunctions which might compromise the mission.

The basic principle of model-based diagnostics is the comparison between the expected or nominal behaviour of a system, provided by a model of the system, and the actual behaviour inferred from measurements on the system, acquired by means of a set of sensors associated to said system.

In general, the model-based diagnostics of a system includes three phases:

Fault detection: given a specific set of inputs to the system and its model, a system simulation is carried out to compute the expected sensor readings. Any discrepancy or inconsistency between sensors expected readings and their actual values indicates a fault. This phase essentially consists in determining whether inconsistencies occur between expected and observed sensor measurements;

Generation of the sets of conflicts: in this phase, given the inconsistencies between expected and actual sensor readings, a large number of sets of conflicts is generated, each of them implying that at least one of its components is faulty, due to the observed inconsistencies;

Diagnosis: in this phase, given the sets of conflicts, the system is diagnosed, i.e. the minimum number of faults is determined. This phase is carried out solving problems of determining a hitting set, which determine the minimum number of components intersection of all the sets of conflicts, starting from the given sets of conflicts. This minimum set represents the set of faulty components originating the observed inconsistencies, and therefore represents eventually the diagnosis of the system.

The first phase of fault detection is immediate and requires only a simulation of the system. The third phase was for a long time a limitation to an efficient diagnosis, but recently a logical-mathematical tool has been developed which allows a rapid solution to the problem of determining a hitting set, even for complex systems. The current obstacle to a rapid system diagnosis is the lack of efficiency in the phase of generating the sets of conflicts.

Presently there are two classes of methodologies and different approaches to derive sets of conflicts.

In the last few decades, research in the field of system diagnostics, based on a model describing the functions of the system components and its connectivity or topology, has been carried out essentially according to two different paths: one, the approach of Fault Detection and Isolation (FDI), exploits the complete knowledge of the system and is based on automatic control theories and statistical decisions; the other, known as DX approach, does not need the complete knowledge of the system and is based on Artificial Intelligence techniques applied to a set of assumptions on the modes of operation of the system as a whole.

The FDI approach uses for its application the Analytical Redundancy Relations (ARRs), also known as residuals or parity equations, each of them representing a different relation between measured parameters of the system. Each unsatisfied ARR indicates a discrepancy between the expected system behaviour and the actual one, and allows the detection of a system malfunction, due to some fault, compared to normal operation.

The DX approach is based instead on the concept of conflict, and more generally of conflict set, which is a set of system components, for which the assumption of correct operation is not consistent with the observed system behaviour.

Recently, a unified picture of the two mentioned theories has shown their fundamental equivalence. The relation between the concepts of analytical redundancy relation and of conflict has been recognized in the fact that the support of an ARR, i.e. the set of components involved in that ARR, is a possible conflict, i.e. a possible scenario of measurements on the system exists, which generates that set as a conflict.

Both approaches, individually adopted to carry out the diagnostics of a system, exhibit significant computational disadvantages, which make them inefficient for many interesting applications.

As far as the approach based on the ARRs is concerned, the known algorithms for the generation of a complete set of ARRs exhibit an exponential computation complexity, so that the generation and application of ARRs for real cases turn out to be practically impossible.

Moreover, for many practical systems of interest, the set of ARRs may not be obtainable in analytical form, thus preventing its actual use.

On the other hand, in the DX approach, the most commonly used General Diagnosis Engine (GDE) algorithm requires performing many consistency checks between expected values from the model and observed values on the system, while many of said checks might turn out not being strictly necessary for the diagnosis result, thus its application as well leads to an exponential computational complexity.

The DX and FDI Approaches

In the following a deeper discussion of the approaches to system diagnostics according to the known DX and FDI techniques is provided, aimed to clarify and explain the developments of the invention.

In model-based diagnostics, the models of the devices forming a complex system are compared to the observations of the actual behaviour of the system to detect possible discrepancies (inconsistencies) and to diagnose the originating causes (faults).

A System Model (SM) consist of a Behavioral Model (BM) and of an Observation Model (OM). The behavioral model BM is a description of the system based on its components and consists of a set of Primary Relations (PR). Each component is described by the function it performs, i.e. by one or more primary relations PR and by its inputs and outputs, so that the components-based description includes the system topology as well. The observation model OM is the set of relations defining the observations carried out on the system by means of a plurality of sensors associated to it.

FIG. 1 shows the example of a multiport system, consisting of three multipliers ($M_1$, $M_2$, $M_3$) and two adders ($A_1$, $A_2$).

The behavioral model of this system, which provides its description in terms of components and topology, is given by a set of Primary Relations PR and by the components associated to them, as defined by the following:

$PR_1$: x=a c; $M_1$
$PR_2$: y=b d; $M_2$
$PR_3$: z=c e; $M_3$
$PR_4$: f=x+y; $A_1$
$PR_5$: g=y+z; $A_2$

The DX Approach

From the point of view of the DX approach, each PR is modelled as a set of rules to propagate the values from a variable to another variable.

For example, the component multiplier $M_1$ is defined by the following three rules, which assume the condition that $M_1$ operates correctly.

1) x=ac
2) if (a≠0) then c=x/a
3) if (c≠0) then a=x/c

Notice that while the first rule infers an output given the inputs, the other two determine conditionally an input, given the output and the other input.

In fact, the DX approach allows each variable to take a set of possible values given different assumptions, and taking into account each value together with the use of the relevant rules allows the computation of the values of other system variables. As these computations are based on initial assumptions, a DX algorithm tags each value assigned to a variable with the assumptions leading to its computation (tagged value).

Therefore, the above mentioned rules actually translate into the following ones, where $S_v$ is the set of values which can be associated to the variable v, and $<n:N> \in S_v$ means that v=n (i.e. the variable v takes the value n) when the set of assumptions N is fulfilled.

$<n:N> \in S_a \wedge <m:M> \in S_c \Rightarrow <nm:N \cup M \cup \{M1\}>$
$\in S_x <n:N> \in S_a \wedge <m:M> \in S_x \wedge n \neq 0 \Rightarrow <m \div n:N \cup M \cup \{M1\}>$
$\in S_c <n:N> \in S_c \wedge <m:M> \in S_x \wedge n \neq 0 \Rightarrow <m \div n:N \cup M \cup \{M1\}>$
$\ddot{A} S_a$ For example, setting the inputs a=2 and c=2 determines the addition of <2:{ }> in $S_a$ and of <2:{ }> in $S_c$, which leads the DX algorithm to infer that <3:{M1}>∈$S_x$, which triggers further inferences adding an element to the set $S_x$.

A discrepancy or inconsistency arises during the inferential propagation of values between the system variables, from the inputs to the outputs, when two different values are assigned to the same variable.

For example, setting all the inputs of the multiport system in FIG. 1 to "2" determines by inference <8:{M2,M3, A2}>∈$S_g$.

A later measurement g=9 determines a discrepancy because <9:{ }> is also an element of $S_g$ due to the measurement, but is not consistent with the system model. The union of the assumptions contributing to this result leads to the detection of a discrepancy, which implies that $M_2$, $M_3$, or $A_2$ must be a faulty component.

Typically, in the course of an inferential propagation of values within a system no discrepancies are found, but when faults occur in a system a plurality of discrepancies may show up. In fact the process of causal inference continues to determine new discrepancies until the propagation of the possible tagged values of the variables at the output of the system is completed; this may require a very long time, as the number of values assigned to each variable may grow exponentially with the number of possible assumptions. This leads a generic DX algorithm to require an exponential time to propagate the values in the whole system.

Next, the generic DX algorithm finds the minimal sets of assumptions intersection of all the detected discrepancies, which represent the diagnosis of the causes of the contradictory measurements.

Unfortunately, the computation of the minimum set has equivalent complexity to the problem of computing the prime implicants, which is a NP-complete problem.

For improved performance, the DX algorithm GDE (General Diagnosis Engine) uses a minimalist approach to the management of the sets, eliminating $<n:L_i>$ from a set if $<n:L_j>$ belongs to the set and $L_j \subset L_i$. This is possible because the second element makes $<n:L_i>$ redundant when a value is determined on the basis of the starting assumptions.

The set of discrepancies is further minimized by eliminating a redundant discrepancy $L_i$ when another discrepancy $L_j$ exists such that $L_j \subset L_i$. Such tests on subsets reduce the computational loads of the inferential process, but also imply that the test procedure is called many times in the algorithm, and this anyway requires a long computing time.

In the end, the diagnostic model according to the DX approach results in a system in which each variable can be tested. However, the goal would be to test the smallest possible number of variables. Actually, a DX algorithm is able to identify a number of possible diagnoses of a discrepancy and to suggest the measurement of a determined subset of variables to reduce the ambiguity of the diagnosis.

Although this approach is theoretically advantageous, in practice one realizes that some variables cannot be measured when the system of interest is in a remote location or unreachable (e.g. in the case of spacecraft traveling in deep space). The DX approach must therefore be applied by defining in advance the actually measurable variables, i.e. the sensors associated to the system which allow its observation. The problem therefore arises to identify a priori the most suitable variables to be measured, to minimize the ambiguities of the diagnosis.

The FDI Approach

The main feature wherein the FDI approach differs from the DX approach is the initial assumption that the observation sensors are defined a priori.

The optimization of sensors and the diagnostic technique are based on the concepts of Analytical Redundancy Relation (ARR) and Fault Signature Matrix (FSM).

In the following the concepts of ARR and FSM are introduced and briefly discussed, for the sake of clarity and simplicity considering the case of single fault only in a system.

The set of variables (V) in a system, for example the system shown in FIG. 1, can be decomposed into a set of unknown variables (X) and a set of observed variables (O), i.e. the relation V=X∪O holds.

An Analytical Redundancy Relation (ARR) is a constraint deduced from the system model (SM). The ARRs can be deduced from the SM by elimination of the unknown variables from the Primary Relations (PR). Therefore an ARR contains observed variables only, hence it can be computed from them.

The support of an ARR is the subset of components involved in the derivation of said ARR.

For the system shown in FIG. 1, if the sensors are deployed at outputs f and g, and the inputs a, b, c, d, e are known, then O={a, b, c, d, e, f, g} and X={x, y, z}.

The resulting ARRs are listed in the following Table 1:

TABLE 1

ARRs, support components and sensors for the example in FIG. 1

| ARR | Support components | Sensors |
|---|---|---|
| $ARR_1$: f = ac + bd | $M_1, M_2, A_1$ | f |
| $ARR_2$: g = bd + ce | $M_2, M_3, A_2$ | g |
| $ARR_3$: f − g = ac − ce | $M_1, M_3, A_2, A_1$ | f, g |

The ARRs are then used to check the consistency of the observations on the system against the SM. In other words, the ARRs are satisfied if the observed system behaviour satisfies the model constraints, i.e provides observations expected from the model.

Under the assumption of a single fault, i.e. if one component only of the support of an ARR is faulty, then that ARR is not satisfied.

In fact, together with the concept of support set, this statement is the basis of the approach of model-based diagnostics within the FDI methodology.

A Fault Signature Matrix (FSM) can be deduced from the ARRs. The FSM is defined as a binary matrix whose rows are the ARRs generated for the system under study and whose columns represent the system components.

An element $FS_{ij}$ of this matrix equals 1 if the associated system component $C_i$ belongs to the support of relation $ARR_j$, otherwise $FS_{ij}=0$. The i-th column corresponding to component $C_i$ is defined as Fault Signature Vector (FSV) of $C_i$ and is called $FSV_i=[FSV_{i1}, \ldots, FSV_{in}]^t$.

Referring to the system depicted in FIG. 1, the FSM can be deduced from Table 1 and is shown in the following Table 2.

TABLE 2

Fault Signature Matrix for the system shown in FIG. 1

|  | $A_1$ | $A_2$ | $M_1$ | $M_2$ | $M_3$ |
|---|---|---|---|---|---|
| $ARR_1$ | 1 | 0 | 1 | 1 | 0 |
| $ARR_2$ | 0 | 1 | 0 | 1 | 1 |
| $ARR_3$ | 1 | 1 | 1 | 0 | 1 |

The case of multiple faults can be dealt with by expanding the columns of the FSM. The multiple fault signature vector FSV can be obtained from the single fault signature vectors $FSV_k$ occurring simultaneously, by carrying out a logical OR operation between corresponding elements of the corresponding $FSV_k$. Therefore, in a system having n components, taking into account all the possible combinations of multiple faults leads to the generation of a FSM having $2^n$ columns.

The system diagnostics is therefore based on the evaluation of the ARRs, starting from a set of observations on the system.

If an $ARR_i$ is satisfied on the basis of the observations, then $ARR_i=0$, otherwise $ARR_i=1$. The ARRs are instantiated with the observed values, providing an observed signature. The signature of the i-th observation is defined as a binary vector $OS_i=[OS_{i1}, \ldots, OS_{in}]^t$, where $OS_{ij}=0$ if $ARR_j$ is satisfied by the observations, and $OS_{ij}=1$ otherwise.

Table 3 shows the diagnosis of the system shown in FIG. 1, on the basis of different observation signatures.

TABLE 3

Diagnosis of the system depicted in FIG. 1, for different observation signatures.

| Diagnosis | Observations | | | | |
|---|---|---|---|---|---|
| $ARR_1$ | 0 | 0 | 1 | 1 | 1 |
| $ARR_2$ | 0 | 1 | 0 | 1 | 1 |
| $ARR_3$ | 0 | 1 | 1 | 0 | 1 |
| Single fault diagnosis | none | $A_2$; $M_3$ | $A_1$; $M_1$ | $M_2$ | none |
| Multiple fault diagnosis | none | $(A_2, M_3)$ | $(A_1, M_1)$ | none | All the sets of double faults, $(A_1, M_1)$ and $(A_2, M_3)$ excluded |

The diagnosis is given on the basis of the faults taken into account in the FSM, i.e. an observed signature $OS_i=[OS_{i1}, \ldots, OS_{in}]^t$ is consistent with a fault signature $FS_i=[FS_{i1}, \ldots, FS_{in}]^t$ if $FS_{ij}=OS_{ij}$ for each j.

For example, for the system in FIG. 1 the $OS=[0,1,1]^t$ is equivalent to the fault signature of components $A_2$ and $M_3$.

Notice that this shows that, depending on the system sensors, the faults of components $A_2$ and $M_3$ cannot be discriminated, as in the case of $A_1$ and $M_1$.

The criterion of detection and isolation (fault discrimination) can be described in terms of FSM.

All faults can be detected (complete detection) if there is no null column (i.e. no FSV with all zero elements) in the FSM. That is, for a given faulty component $C_i$, at least one ARR is affected. Fault isolation is guaranteed if there are no two identical columns in the FSM, since this fact would imply that the two FSVs are identical and therefore the corresponding faults cannot be discriminated.

The biggest obstacle in the use of the ARRs for a diagnostic procedure comes from the efficient generation of the complete, non-redundant set of ARRs, which is at present a limitation of the available algorithms for the execution of diagnoses according to the FDI approach.

A first feature to be taken into account is the possible number of ARRs.

Let's consider a system described by n primary relations (PR) (typically this means that the system has n components, but in general this might imply that the system has at most n components) and m sensors (observations), where n>m in most realistic cases.

If the ARRs are considered as functions of all possible combinations of observations, then the total number of ARRs would be of the order of $O(2^m)$. On the other hand, if we consider that the ARRs are derived from the combination of PRs by eliminating the unknown variables, this implies an upper bound to the number of ARRs of the order of $O(2^n)$.

The key point, which the inventors believe has not been sufficiently appreciated in the currently used techniques, is the fact that the ARRs may involve all the possible combinations of PRs and observations.

Actually, the same set of PRs can lead to different ARRs, i.e. to different ARRs having the same support set, but different sets of observations.

Cases may also occur, wherein the same set of observations can lead to different ARRs, which differ in their support components.

Taking this view, we can therefore conclude that the upper bound to the total number of ARRs is actually of the order of $O(2^{n+m})$. Of course, for any realistic system the number of ARRs is always finite, due to the structural constraints of the system.

Another fundamental question in the application of the ARRs, both for system diagnostics and for the problem of sensor optimization, is related to the completeness of the set of ARRs. More precisely, the inventors are aware of the fact that the problem of the minimum complete set of ARRs has not attracted so far sufficient attention.

In the literature the concepts of d-completeness (completeness as to fault detection) and i-completeness (completeness as to fault isolation) have been discussed. However, these two concepts can be used only for the applicability analysis of a given set of ARRs for the diagnosis of a system, while the problem of generating a complete set of ARRs is not directly faced; on the other hand it is obvious that completeness is a fundamental issue both for diagnostics and for sensors optimization, since the highest possible information from the ARRs is required for both problems.

It is also obvious that any application of an incomplete set of ARRs, both for system diagnostics and for optimization of sensors associated to said system, may lead to wrong or suboptimal results.

The inventors, in their article "A new efficient method for system structural analysis and generating analytical redundancy relations", Proc. IEEE Aerospace Conference, March 2009, have presented an innovative method for the generation of a complete set of ARRs, whose complexity is only $O(L^4)$, even in the worst case, where L is the number of relations in the system; this method solves some limitations of the ARR generation algorithms known before, disadvantageously non-deterministic and exhibiting exponential complexity.

Another issue to be considered is that, although the complexity of computing the ARRs is specific for each system, a common disadvantage of this technique is the fact that the evaluation of all the ARRs is required to diagnose the system; this implies heavy computation loads even if there is no fault in the system. In other words, it is not possible to determine a priori a subset of ARRs whose computation is sufficient to respond to the specific diagnostic needs.

Another issue to be considered is the actual feasibility of the computation (evaluation) of the ARRs. As an ARR is by definition generated by combining a set of PRs, such combination may require the inversion of the functions representing one or more PRs, expressed in analytical form. As a matter of fact, in real systems encountered in practical applications, the functions representing primary relations of some non-linear components cannot be inverted in analytical form, but can only be expressed numerically: this poses a further major obstacle, increasing the computational load of the procedure and limiting its practical applicability.

Finally, as above mentioned, after evaluating the ARRs and forming the observation or observed signature vector, the latter must be compared to the fault vectors in FSM. Although this operation is rather simple, its complexity is increased in case of multiple fault diagnosis.

If we consider a system having n components and all possible combinations of faults, then a FSM having $2^n$ columns would be generated: this leads to an exponential growth of the memory space to be allocated to the FSM in the computing system for the execution of the diagnostic algorithm, and in the computing time required by said system to carry out the comparison of the observation vector against the fault vectors.

SUMMARY OF THE INVENTION

The present invention aims to provide a satisfactory solution to the problems exposed above, while avoiding the drawbacks of the known art.

More specifically, the present invention aims at providing an efficient, particularly from the point of view of computation, and accurate method for the timely diagnosis of critical faults in a system, based on a system model.

According to the present invention, these goals are achieved thanks to a method for the generation of a set of conflicts for model-based diagnosis of a system, providing the features stated in Claim 1, and a diagnostic method having the features stated in Claim 6.

Specific embodiments are the object of dependent claims, whose content is to be taken as integral part of the present description.

Further objects of the invention are a diagnostic system and a computer program to implement the above described methods, as claimed.

The present invention is based on the principle of combining the advantageous features of the above described DX and FDI approaches, and particularly of the DX GDE algorithm and of the ARR-based FDI algorithm, while avoiding the integral application of each of them, which would lead to the above mentioned disadvantages.

In particular, the method object of this invention takes advantage of the diagnostic approach based on the ARRs, which correspond to the potential conflicts supporting the DX diagnostic technique, since the ARRs are generated a priori once for all for a given system. This allows to carry out a faster diagnosis, as compared to the repeated execution of conflicts set searching algorithms according to the DX approach.

More specifically, the ARRs are generated according to the method described by the inventors in the quoted article "A new efficient method for system structural analysis and generating analytical redundancy relations", Proc. IEEE Aerospace Conference, March 2009.

Each intermediate relation, in the following shortly called $R_j$, used to derive the set of ARRs, which by definition involve only known variables (observations), is given by a quadruple having the following form:

$$R_j = (N_j, C_j, S_j, T_j)$$

where $N_j$ is the progressive number assigned to $R_j$, $C_j$ is the set of support components, $S_j$ is the set of variables involved in $R_j$ and $T_j$ is the set of primary relations PRs used to generate $R_j$.

Specifically, each PR is represented by a quadruple of form $$R_j = (n_j, C_j, S_j, \{n_j\})$$

where $n_j$ is the number of the PR, and since each PR is independent from the other PRs, the last component of the quadruple is $\{n_j\}$.

The basic operation in the method for the generation of a complete set of ARRs is the generation of a new relation starting from two given relations, by eliminating a common variable.

Given two relations:

$$R_j = (N_j, C_j, S_j, T_j) \text{ and } R_k = (N_k, C_k, S_k, T_k)$$

if both the following conditions are satisfied:

$$S_j \cap S_k \neq \{\} \text{ and } T_j \cap T_k = \{\}$$

then, for each non-observed variable $x \in S_j \cap S_k$ the following relation is generated $$R = (N, C_j \cup C_k, (S_j \cup S_k) - \{x\}, T_j \cup T_k),$$

where N is a new number.

As it is possible that the same relations (intermediate or ARRs) are obtained by different derivations, to avoid maintaining additional copies of a same relation, two relations $$R_j=(N_j,C_j,S_j,T_j) \text{ and } R_k=(N_k,C_k,S_k,T_k)$$

are defined as identical if $$(S_j,T_j)=(S_k,T_k)$$

and in the process of generating ARRs, if a new intermediate relation or ARR is identical to a previously generated one, then it is deleted from the list.

Note that the generation of each new relation is carried out in implicit form by set operations, without any need to determine a priori any analytical expression and to compute the inverse of the functions representing one or more relations.

Starting from the complete set of ARRs in implicit form it is anyway possible to derive the FSM of the system, without the need to know exactly the analytical form of each relation and to calculate its inverse form, invoking the derivation of the explicit form and its evaluation only for a limited subset of ARRs for the actual diagnosis of the system.

Each ARR necessary for the diagnosis of the system can be computed numerically taking into account the set of primary relations involved in its derivation, as well as its derivation path, i.e. the combination order of said primary relations. It must be stressed that the evaluation of the subset of ARRs requires only the numerical inversion of the corresponding function, and not the determination of the analytical form of its inverse.

Therefore it is possible to exploit the two advantageous features of the diagnostic approach based on the evaluation of ARRs, that is the derivation once only of the ARRs determining the relations between the observed sensors readings and the system components, as well as the possibility of generating the Fault Signature Matrix for an a priori analysis of the system fault detection and isolation properties and the determination of the ambiguity sets in the diagnosis.

To avoid the computation burden related to a diagnosis based on ARRs according to the known FDI technique, which would require the evaluation of all ARRs (an increasingly difficult task when the corresponding analytical forms are not available and they have to be computed numerically, since the derivation of the ARRs must be conveniently performed in real time any time the diagnostic algorithm is executed), the invention is based on the principle of reducing the number of ARRs to be evaluated as key factor to improve the efficiency of the diagnostic method.

As discussed in the article by M-O. Cordier et al. "Conflicts vs. analytical redundancy relations: a comparative analysis of the model based diagnosis approach from the artificial intelligence and automatic control perspectives", IEEE Transactions on Systems, Men and Cybernetics, Part B: Cybernetics, vol. 34, n. 5, pp. 2163-2177, October 2004, the ARRs can be grouped into detection ARRs (D-ARRs) and isolation ARRs (I-ARRs). The D-ARRs involve one sensor or system observation variable only (therefore their total number equals the number of sensors), while each of the I-ARRs depends on a plurality of sensors (system observation variables). The ARR generation algorithm detects directly which and how many sensors are involved, therefore allows their automatic classification.

In the example of the multiport system shown in FIG. 1, $ARR_1$ and $ARR_2$ are D-ARR, while $ARR_3$ is a I-ARR.

According to the invention, only D-ARRs determine the expected sensor values.

These ARRs represent actually the simulation of the system, i.e. the relations to compute the expected sensor values using the system model, for a given set of values for the input variables. Note that each D-ARR involves one sensor only, therefore the number of D-ARRs equals the preselected total number of sensors in the system. Moreover, the D-ARRs do not require any inversion of the corresponding function.

Therefore, the method object of the present invention to generate a set of conflicts and the diagnosis of a system includes, as a first step, a fault detection operation, wherein given a set of inputs a model-based simulation of the system is carried out, to determine the expected sensor readings. This corresponds to the evaluation of the D-ARRs. If the expected sensor values match the observed ones, i.e. the D-ARRs are satisfied, then there is no fault in the system.

If the expected values of the sensors do not match the measured ones, this corresponds to a discrepancy, according to the definition of the DX approach.

Then a further step of conflicts generation is carried out, starting from the knowledge of the sensors representing the detected discrepancies, that is the sensors whose expected values do not match the measured ones.

According to the invention, in the set of I-ARRs those not involving any sensor exhibiting discrepancies are necessarily satisfied, as they represent relations between system inputs and correct observed measurements, expected from the model. On the contrary the I-ARRs involving one or more sensors exhibiting discrepancies are considered as potential conflicts.

The I-ARRs involving one or more sensors exhibiting discrepancies (a subset of all the possible I-ARRs) are then computed and evaluated carrying out a consistency check.

The consistency check determines whether each I-ARR being examined, i.e. belonging to the subset of I-ARRs depending on a plurality of sensors involving faulty components, is satisfied. This check is not executed by explicitly computing the I-ARR (which is generated only in implicit form, as an explicit or analytical form might not exist), but by computing the consistency of the results of the primary relations involved in the I-ARR itself: if these are consistent, the corresponding I-ARR is satisfied, otherwise it is not.

A satisfied I-ARR is excluded from further operations. The support of each I-ARR detected as not satisfied represents definitely a conflict.

At this stage, having determined which ARRs are not satisfied, an observation vector can be formed and system diagnosis can be carried out by means of the FSM, according to a FDI approach.

As it is clear, this innovative combined approach leads to a higher efficiency compared to the GDE technique alone, or to the ARR-based technique alone, because it reduces the computation to the evaluation of a subset of ARRs.

Finally, since for complex systems the multiple-fault diagnosis by means of an expanded FSM would lead to exponentially increasing burdens in terms of memory space and computing time, it is preferable to perform a minimal diagnosis by solving the corresponding problem of determining the hitting set, i.e. the minimum set intersection of all the previously determined sets of conflicts, that is the minimum set of components whose at least one belongs to each of the sets of potentially faulty components, as defined by the unsatisfied ARRs. Although the problem of determining the hitting set is a NP-complete problem, it is possible to solve it efficiently in practical cases, for example by using the branch-and-bound algorithm described by A. Fijany e F. Vatan in "New high performance algorithmic solution for diagnosis problem", Proc. IEEE Aerospace conference, March 2005, and in the U.S. Pat. No. 7,249,003 "System for solving diagnosis and hitting set problems", by the same authors.

BRIEF DESCRIPTION OF THE DRAWINGS

Additional features and advantages of the invention are better explained in the following detailed description, provided as a non-limiting example, with reference to the attached drawings, where.

DETAILED DESCRIPTION OF THE PREFERRED EMBODIMENTS

Figure 1:
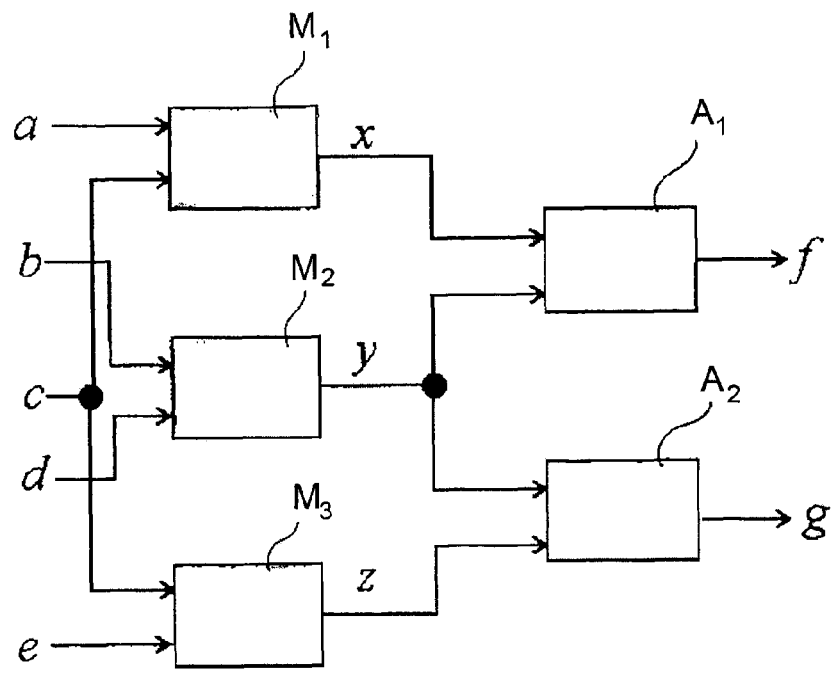
FIG. 1 depicts a circuit schematic of a multi-port system analyzed in the introductory part of this description.

A processing system for the diagnosis of a system according to the method object of this invention includes a computing workstation of known type (not depicted), or a distributed-type processing system, having a processing subsystem and local or remote peripheral input/output devices, arranged to execute a processing and computing program or program groups/modules stored on disk or accessible via a network, which implement the algorithm object of the invention. Such solutions here recalled are considered as well known in the art and will not be further described here, as not relevant as such to the implementation and understanding of the present invention.

To better understand the development of the combined method object of the invention, based on generating implicit ARRs and extracting from them a set of conflicts for the diagnosis of a system, it is useful to provide a short introduction to the DX approach according to the known technique, so that its domain can be extended to the present method in a framework of common notations.

According to the DX approach, the variables of a system are represented by a variables vector and each primary relation PR is represented by a set of rules to propagate values from one variable to another.

Each rule includes five components, described in the following, where the variables are stated in vector Vars [ ].

out index in Vars[ ]
in[ ] index vectors in Vars[ ]
Fn( ) function on the inputs
Tst( ) test on the inputs
A assumption In a traditional DX approach, each element in Vars [ ] contains a set of zero or more expressions of the form <value: {assumptions}>, which mean that a variable can take a specific value depending on which set of assumptions holds. For example, with reference to the multi-port system shown in FIG. 1, the first rule, expression of the multiplier $M_1$, would have the following five components, where indices 1, 3, 6 in vector Vars[ ] represent variables "a", "c" and "x", respectively.

out=6
in[ ]=[1,3]
Fn( )=multiply( )–simply multiplies the inputs
Tst( )=true( )–simply returns true
A=$M_1$ Given this representation of variables and rules, the propagation of values in the system follows the algorithm in Table 4, which represents the routine Propagate( ) where Vars[V] takes a value C whenever the non-contradictory set of assumption S holds.

To determine if a set of assumptions is contradictory, a comparison is performed against the elements of a set NGDS, containing all the known contradictory sets of assumptions.

TABLE 4

Routine for the propagation of values between variables
of a system, according to a predefined set of rules
Propagate(V, ⟨C:S⟩, Rules, Vars, NGDS)
Let Agenda2 ← ∅
For each R ∈ Rules, where V = R.in[X] for some X do
   For each P, where P[X]= ⟨C:S⟩ ∧ P[i]= ⟨ $c_i$:$s_i$ ⟩∈Vars[R.in[i]] do
      If R.Tst(P) ∧ N ⊄ ∪(Si) ∪ {R.A} for any N ∈ NGDS then
         Add [R.out, ⟨R.Fn(P):∪(Si) ∪ {R.A}⟩] to Agenda2
Return Agenda2

The propagation routine Propagate( ) gets its input variables and a set of rules (Rules) and iterates over each rule having Vars[V] as input. As each rule has several input variables, and each variable can take several values as function of the assumptions, each rule can propagate a number of values depending on its inputs. This computation, for each rule, is performed by the inner loop in the routine, which ensures that the input for V is <C:S>.

Each iteration of the inner loop performs two tests to determine if the rule should be applied to its set of inputs. The inputs taken into account in the computation must pass the test function Tst( ) of the rules and the assumptions must not contradict one another. The contradictions are tested collecting the union of the assumptions and determining if the resulting set contains a contradictory set belonging to NGDS.

Whenever a rule is applied a tagged value is computed to be assigned to an output variable, and these tagged value assignments are collected into the set Agenda2 of unsatisfied relations (conflicts set) and ultimately returned to the calling routine.

The DX Algorithm

The most frequently quoted algorithm in the DX literature, which uses the above recalled propagation routine, is certainly the GDE algorithm.

The general approach used in the DX technique is to assume a set of observations and to propagate them through a system model, looking for inconsistencies between assumptions and observations. Given these inconsistencies, the DX algorithm looks for the set of unsatisfied assumptions which best accounts for the observations.

As an example, the following Table 5 contains a mGDE algorithm, a simplified version of the GDE algorithm, which uses the procedure Propagate( ) to propagate values.

TABLE 5

DX algorithm for value propagation
mGDE(Agenda, Rules)
Let NGDS ← ∅, Vars ← [∅, ∅, ...]
While Agenda is not empty do
  Extract [V, ⟨C:S⟩ from Agenda
  If there is no ⟨C:S'⟩ ∈ Vars[V], where S' ⊂ S
    Remove all ⟨C:S'⟩ ∈ Vars[V], where S ⊂ S'
    Add ⟨C:S⟩ to Vars[V]
    For each ⟨D:L⟩ ∈ Vars[V] where D≠C do
      Add S∪L to NGDS removing redundancies,
      Remove all ⟨X:Y⟩ from Vars where Y ⊇ S∪L
      Remove all [W, ⟨X:Y⟩] from Agenda where Y ⊇ S∪L
    Add Propagate(V, ⟨C:S⟩, Rules, Vars, NGDS) to Agenda
Return HittingSets(NGDS)

This algorithm simply assumes an initial Agenda of tagged value assignments and processes them to determine sets of mutually inconsistent assumptions.

Each iteration, which is performed by the outermost WHILE loop, processes a single tagged value assignment. If that assignment is not redundant in respect of the tagged values already assigned to the corresponding variable, then it is added to the set of tagged values for that variable. When an addition makes other tagged values redundant, these are then deleted from the set of the variable. Formally, a tagged value <C:S> makes <C:T> redundant whenever assumptions S imply assumptions T, i.e. S ⊂ T.

When a tagged value is assigned to a variable, the innermost FOR loop handles the sets of inconsistent assumptions. First of all, a variable cannot assume two different values at the same time, therefore this condition is marked as an inconsistency. The inconsistencies are added to the NGDS set after removing the redundancies, where a set is considered redundant if it is a superset of another. These inconsistencies also are used to remove elements from Agenda and from vector Vars[ ] when their tags are determined as inconsistent.

Finally, the ultimate result returned by mGDE is the hitting set of the inconsistencies, that is the set containing at least one element from each of the inconsistency sets.

The diagnosis set is given by the set of minimal hitting sets of NGDS.

The Algorithm Based on Implicit ARRs, Object of the Invention

Let's consider an ARR as an analytical equation to be tested and a set of assumptions which turn out to be mutually inconsistent when the equation does not hold.

Instead of testing the equation, only the set of sensors involved in the test of the equation is characterized. Therefore, for a system diagnosable using the method according to the invention, an ARR has two components:
sensors a set of observable variables
assume a set of assumptions Using this characterization of ARRs, the diagnostic algorithm includes a DX model of the device to test each ARR, and the ARR-based diagnostic procedure (the algorithm) looks like the one shown in Table 4, where the inputs are values imposed to the system and the outputs are observed values. This differs considerably from the above recalled mGDE routine, which relies only on the parameter Agenda, with tagged value assignments for both inputs and outputs.

As shown in the following Table 6, the algorithm initially performs a WHILE loop to simulate a system starting from the imposed inputs and to compute the expected outputs.

TABLE 6

Diagnostic algorithm based on implicit ARRs
mARR(Inputs, Outputs, Rules, ARRS)
Let NGDS ← ∅, Vars ← [∅, ∅ ...], and Agenda ← Inputs
While Agenda is not empty do
  Extract [V, ⟨C:S⟩] from Agenda & add ⟨C:∅⟩ to Vars[V]
  Add Propagate(V, ⟨C:∅⟩, Rules, Vars, ∅) to Agenda
BADS ← {V| [V, ⟨C:∅⟩] ∈ Outputs ∧ Vars[V] ≠ {⟨C:∅⟩}}
For each A ∈ ARRS
  If BADS ∩ A.sensors ≠ ∅
    Let Vars ← [∅, ∅ ...]
    Let RS ← {R | R ∈ Rules ∧ R.A ∈ A.assume}
    Let Agenda ← Inputs ∪ Outputs
    While Agenda is not empty do
      Extract [V, ⟨C:X⟩] from Agenda & add ⟨C:∅⟩ to Vars[V]
      If Vars[V] = {⟨C:∅⟩, ⟨C:∅⟩}
        Vars[V] ← {⟨C:∅⟩}
      Else if Vars[V] = {⟨C:∅⟩, ⟨D:∅⟩} where C≠D
        Add A.assume to NGDS and empty Agenda
      Else
        Append Propagate(V, ⟨C:∅⟩, RS, Vars, ∅) to Agenda
Return HittingSets(NGDS)

The computed outputs are then checked against the measured outputs to determine the set BADS of measured values inconsistent with the computed expected values.

This set is then used to determine which ARRs are to be further checked, to compute the plurality of sets of inconsistent assumptions (conflicts). Therefore, the next FOR loop iterates over each ARR and tests if the sensors contributing to that ARR intersect the set BADS.

The test of an ARR involves evaluating if the inputs and observed outputs are consistent with the rules implied by the assumptions of said ARR. Therefore, the innermost WHILE loop has several similarities with the mGDE algorithm. The main difference is that the values don't need tags. It turns out that the test for the ARR fails whenever two different values are assigned to the same variable. Therefore the tags are totally superfluous and a variable will never have more than one associated value.

Therefore, calling Propagate( ) by mARR( ) never returns more than one value to be added to the Agenda set of conflicts or unsatisfied relations.

CONCLUSIONS

A check of the performance of the method object of this invention has been carried out by comparing the results of a diagnosis procedure based on a traditional DX approach with the results of a diagnosis procedure based on the algorithm proposed by the inventors, by means of a test on circuits composed by adders and multipliers like the example multi-port circuit, shown in FIG. 1.

To check the correctness of both approaches, faults have been imposed to each component of the system, and both algorithms have been executed to get a set of diagnostic results, which in turn have been mutually compared to check if they provided the same diagnosis sets.

Figure 2A:
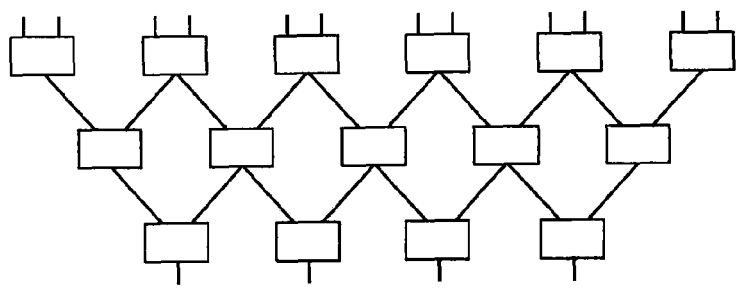
FIGS. 2a and 2b represent corresponding circuit schematics of combinatorial circuits to which the method object of this invention is applied.
Figure 2B:
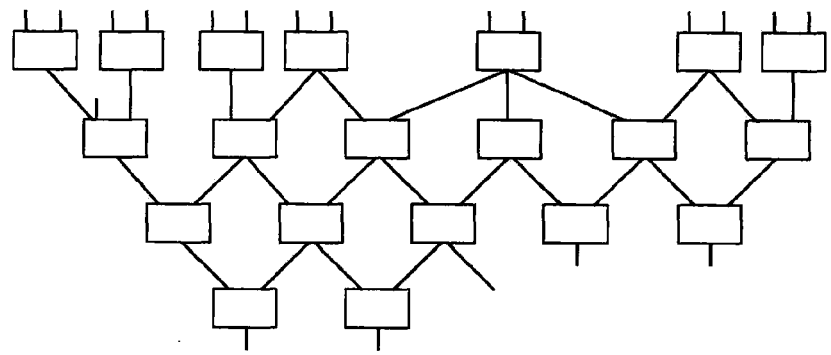

As examples, two circuits have been tested, shown in FIGS. 2a and 2b, which depict two schematics of combinatorial circuits including adders and multipliers, where the inputs are at the top and the outputs are at the bottom. Specifically, the first example is an extension of the multi-port circuit of FIG. 1, while the second represents a circuit with a more complex connectivity.

To get information on the relative performance between the known algorithm and the algorithm object of the invention, the algorithms have been executed on both circuits to diagnose a fault imposed at one of the gates.

In all cases the diagnostic algorithms computed the same NGDS set and provided as output the same diagnosis sets, wherein one of the recognized diagnoses was actually the faulty gate.

As the NGDS sets were identical, the best measure of the amount of computations executed by each algorithm is given by the total number of tagged value assignments, provided as output by Propagate( ).

Table 7 lists, as a comparison, a few statistical results for each of the three systems depicted in FIGS. 1, 2a and 2b.

TABLE 7

Comparison results between diagnostics methods

|  | #ARR | mGDE | mARR |
| --- | --- | --- | --- |
| Circuit FIG. 1 | 3 | 45.8 | 9.3 |
| Circuit FIG. 2a | 39 | 1390.5 | 408.9 |
| Circuit FIG. 2b | 94 | 1807.7 | 1244.2 |

In the first column the number of ARRs required to diagnose the system is listed. When any of these ARRs is removed, the mGDE algorithm does not provide the same diagnosis as the mARR algorithm, which proves that the entire set of ARRs is necessary, and it is important that it is determined by the lowest possible computational effort.

The second column reports the total average number of performed computations by the routine Propagate( ) called by the routine mGDE, while the third column reports the total average number of computations by the routine Propagate( ) called by the routine mARR.

These values have been determined by iterating the algorithm over all tests with no fault and with one fault, adding the numbers of resulting tagged assignments, and dividing that number by the number of executed iterations. It can be clearly seen that the routine mARR object of the invention performs definitely better than the routine mGDE.

Therefore the method object of the invention makes advantageously possible the efficient diagnosis of a system, by exploiting in an innovative combination the respective key features of the diagnostic methods based on the ARRs and on the DX technique, while simultaneously avoiding their drawbacks, achieving superior performance compared to the diagnostic techniques entirely based either on the evaluation of ARRs or alternatively on the DX approach.

The proposed method allows a more efficient and accurate derivation of the conflicts sets for the diagnosis of a system. Similarly to the FDI approach, this method uses the ARRs, but in implicit form and not in explicit and analytical form, so that it can be practically applied to any system. Similarly to the DX approach, the method uses consistency checks to evaluate some assumptions on the system, but differently from that approach it exploits the full knowledge of the system, provided by the implicit ARRs, and consequently reduces drastically the number of required consistency checks, achieving much higher efficiency.

The fast and correct derivation of a set of conflicts is the basis for an efficient and timely diagnosis of a system, enabling the implementation of a recovery strategy to avoid further possible damages and/or the loss of the system.

It is clear that, as far as the principle of the invention is maintained, the forms of implementation and the details of the embodiments can be widely varied in respect to what has been here described and illustrated purely as a non-limiting example, while remaining within the protection of the invention as defined by the attached claims.

What is claimed is:

1. A computer-implemented method for generating a set of conflicts to diagnose a system describable by a model based on the arrangement of system components, said model including a set of primary relations (PRs) between inputs and outputs of each component, representing its operating function, and with which system a plurality of sensors is associated for the observation of variables indicative of operation conditions,
where said conflicts set includes a subset of system components for which the assumption of correct operation is not consistent with the observed system behaviour,
wherein the method includes the steps of:
generating, as a preliminary step, a complete set of Analytical Redundancy Relations (ARRs) for the system in implicit form, in which each relation represents the logical relations between a subset of observable variables of the system and a corresponding subset of support components of the system, and
for each diagnosis instance
performing a system simulation based on the model, given a predetermined set of values as system inputs, computing the expected values for a first subset of Analytical Redundancy Relations (D-ARRs) including the relations involving only one system observation variable,
comparing the expected and observed values of the system observation variables and identify the inconsistent observation variables, i.e. the unsatisfied redundancy relations of said first subset, indicating a fault in at least one system component; and
when discrepancies are detected,
checking the consistency of each relation belonging to a second subset of Analytical Redundancy Relations (I-ARR), comprising relations involving a plurality of system observation variables, at least one of which exhibits discrepancies between expected and observed values; and
identifying the support set of the unsatisfied Redundancy Relations of said second subset as set of system conflicts, adapted to detect and isolate the system faults.

2. Method according to claim 1, characterized in that it includes the selection of a complete set of Analytical Redundancy Relations ($ARR_s$) for the system among a set of intermediate relations existing between observable and non-observable system variables,
wherein each intermediate relation ($R_i$) is generated by combining two predetermined relations $$R_j=(N_j,C_j,S_j,T_j) \text{ and } R_k=(N_k,C_k,S_k,T_k)$$

$N_j$, $N_k$ being the ordinal numbers assigned to the relations $R_j$, $R_k$, each being expressed in implicit form as tuple (I) of a subset $S_j$ of system variables, (II) of the set $C_j$ of the support components of said relation, and (III) of the set $T_j$ of the primary relations used to derive said intermediate relation, according to the rule:

$$R=(N,C_j \cup C_k,(S_j \cup S_k)-\{x\},T_j \cup T_k),$$

where $(S_j \cup S_k)-\{x\}$ indicates a symmetric difference operation between the subsets of variables $S_j$, $S_k$ for each non-observable variable $x \in S_j \cap S_k$,
when both the conditions:

$$S_j \cap S_k \neq \{\} \text{ and } T_j \cap T_k=\{\}$$

are satisfied.

3. Method according to claim 2, characterized by the fact that said set of intermediate relations does not include identical intermediate relations, according to the identity relation:

$$(S_j,T_j)=(S_k,T_k).$$

4. Method according to claim 1, wherein the consistency check of each relation of said second subset of analytical redundancy relations (I-ARR) is performed by checking the consistency of the results of the primary relations involved in the relation, expressed in implicit form.

5. Method according to claim 1, comprising the operation of deriving the fault signature matrix for a single-fault theoretical condition, starting from the complete set of analytical redundancy relations generated in implicit form, to analyze the fault detection and isolation properties of the system and determine its ambiguity sets.

6. Method for the diagnosis of a system including a plurality of sensors observation variables representing operation conditions, said diagnosis being based on a system model describing the configuration of the system components and including a set of primary relations between inputs and outputs of each component, representing the corresponding operational function, said method including:

the system simulation based on said model;

the detection of system faults by comparison between the values expected from the simulation and the observed values of the system observation variables;

the generation of at least one conflicts set including a subset of system components for which the assumption of correct operation is not consistent with the observed system behaviour; and the determination of the minimum number of components involved in the generation of conflicts between the expected system behaviour and the observed one, i.e. the intersection of all the generated conflicts;

characterized in that the generation of the conflicts set is carried out by a method according to claim 1.

7. Diagnostic system, including a processing assembly programmed to execute a method for generating a conflicts set and to diagnose a system describable by a model, according to claim 1.

8. Computer program or set of programs, executable by a processor, including one or more code modules to implement a method for generating a conflicts set and the diagnosis of a system describable by a model, according to claim 1.

* * * * *